E. TOWNS.
Governors.
No. 139,631. Patented June 3, 1873.
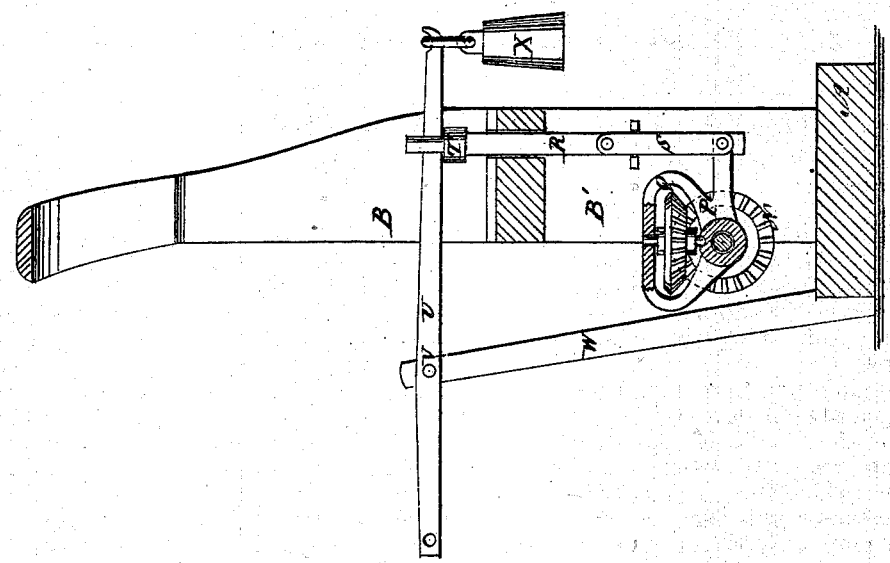
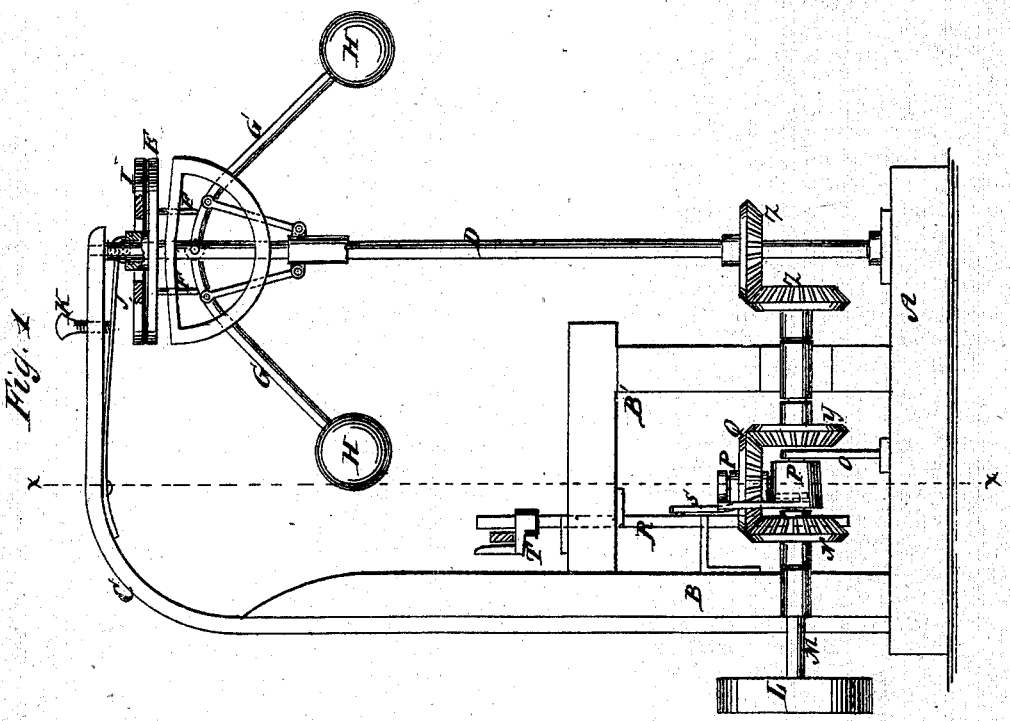
Witnesses:
E. Wolff.
Sedgwick
Inventor:
E. Towns
Per Munn & Co.
Attorneys.

UNITED STATES PATENT OFFICE.

ELSON TOWNS, OF CISNE, ILLINOIS.

IMPROVEMENT IN GOVERNORS.

Specification forming part of Letters Patent No. 139,631, dated June 3, 1873; application filed March 8, 1873.

*To all whom it may concern:*

Be it known that I, ELSON TOWNS, of Cisne, in the county of Wayne and State of Illinois, have invented a new and useful Improvement in Governors, of which the following is a specification:

This invention relates to apparatus for governing the speed of machinery, more especially designed for the steam-engine, but applicable to machinery driven by water, wind, or other motive power; and it consists in the construction, arrangement, and combination of parts hereinafter more fully set forth and described.

In the accompanying drawing, Figure 1 represents a side elevation of my improved governor. Fig. 2 is a vertical section of Fig. 1 taken on the line $x\ x$.

Similar letters of reference indicate corresponding parts.

A is the bed-plate; B B', the frame attached thereto. C is a curved bar, which is attached to B, with its curved end hanging over so as to support the top end of the ball-spindle. D is the ball-spindle. E is a loose disk or washer, which moves freely up and down on the spindle, and by means of the two pins F F it rests on the arms G G of the balls H H, so that when the balls rise or fall the washer follows their motion. I is an adjustable disk or friction-wheel, which is supported by a forked spring, J, to which it is jointed. This spring is adjusted by the set-screw K so that the friction-wheel is raised or lowered thereby. The friction between these two wheels retards the motion of the balls. L is the driving-pulley, and M is the driving-shaft, confined to the stand B of the frame, upon which shaft is the bevel-wheel N. The inner end of the shaft M revolves in the stand O. P is a yoke, which carries the wheel Q, which meshes into the wheel N. This yoke is connected to the vertical shaft R by the small pitman S. T is a fork on the end of the shaft R. U is a lever, whose fulcrum is at the point V on the stand W. The long end of this lever rests in the fork T. X is a weight attached to the long end of the lever. The engine or machine to be governed is connected with the other end of this lever. The ball-spindle D is driven by means of the bevel-wheel Y, which meshes into the yoke-wheel Q and the bevel-gears Z Z, arranged as seen in Fig. 1.

The yoke is so constructed that it turns with the wheel Q, on the driving-shaft, and when the speed is increased the yoke will raise the shaft R and weight, but the increased speed is imparted to the spindle D and will raise the balls. If more than the required speed is attained the friction-wheels will be brought in contact, which will produce a counteracting effect. The difference between the extremes is the speed required, and that is varied by the adjustment of the upper friction-wheel by means of the screw K. The weight on the lever is raised by an increasing velocity, but the tendency to raise is counteracted by the friction caused by the rising of the balls. The opening of the valve, therefore, does not depend upon the action of the balls, as in ordinary governors, but by the positive action of the gearing. The balls simply check or limit the action of the yoke by means of the friction produced.

Having thus described my invention, I claim as new and desire to secure by Letters Patent—

1. The yoke P, pitman S, shaft R, fork T, and lever U, in combination with a governor, substantially as and for the purposes described.

2. The gear-wheels N, Q, and Y, in combination with the yoke P, as and for the purposes described.

3. The improved governor, consisting of the shaft M, gears N Q Y, yoke P, shaft R, pitman S, fork T, lever U, spindle D, ball H, arms G G, friction-wheels E I, spring J, box C, and bed and frame A B B', substantially as and for the purposes described.

ELSON TOWNS.

Witnesses:
C. G. ARCHIBALD,
HARMON MILNER.